Figure 1:
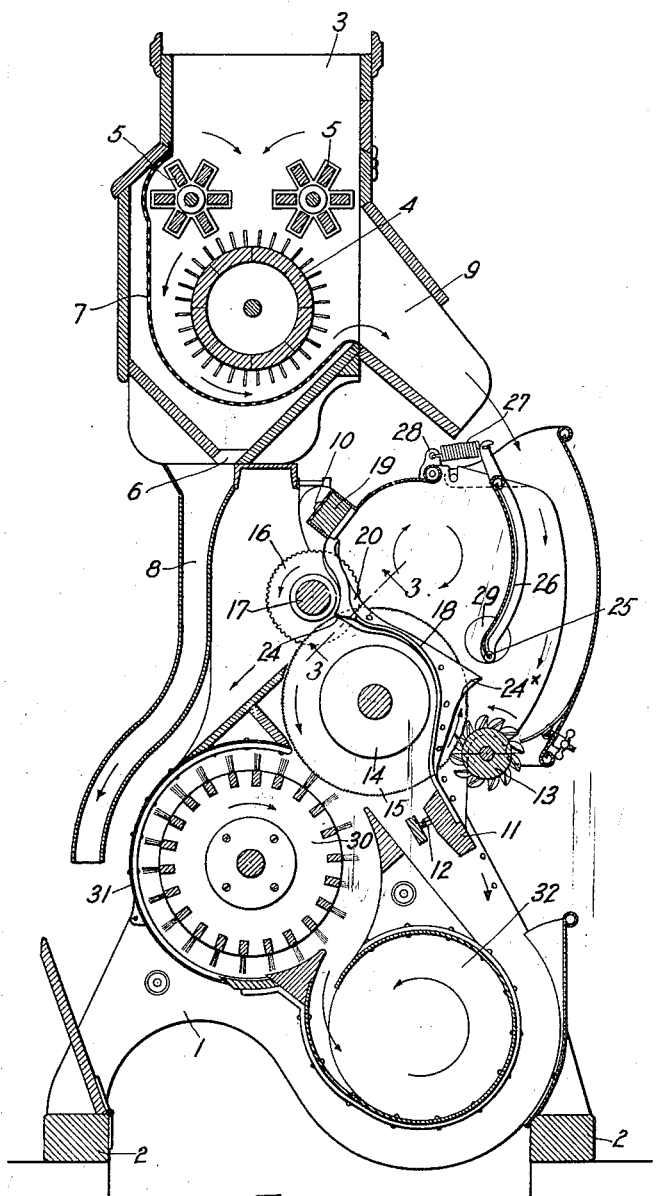

J. R. FORDYCE.
COTTON GIN.
APPLICATION FILED APR. 22, 1911.

1,031,703.

Patented July 9, 1912.

Witnesses:
Amelia M. Ross
May A. Shurley

Inventor:
John R. Fordyce
by Rob't F. Hains
Atty.

UNITED STATES PATENT OFFICE.

JOHN R. FORDYCE, OF LITTLE ROCK, ARKANSAS.

COTTON-GIN.

1,031,703.   Specification of Letters Patent.   Patented July 9, 1912.

Application filed April 22, 1911. Serial No. 622,650.

*To all whom it may concern:*

Be it known that I, JOHN R. FORDYCE, a citizen of the United States, residing at Little Rock, in the county of Pulaski and State of Arkansas, have invented an Improvement in Cotton-Gins, of which the following description, in connection with the accompanying drawings, is a specification, like letters on the drawings representing like parts.

The invention to be hereinafter described relates to cotton gins of the type employing saws for removing the fiber from the seed, and commonly known as "saw gins."

In cotton gins of the common saw type, wherein the saws work between fixed ribs which hold the seed back while the saws detach the fiber therefrom, much injury results to the fiber by reason of the tearing and straining force exerted by the saws upon the fiber. The saws carry the fiber bearing seed against the ribs and hold it there until the cotton roll in the roll box can exert sufficient wiping action on the seed to carry it away, but in the meantime the saws have torn, broken, or weakened the fiber to an injurious extent. Among the attempts that have heretofore been made to overcome this defective action, may be mentioned a series of saw cylinders having overlapping saws spaced so closely together that the seed could not drop between them, but in such an arrangement the practical effect has been that the cotton and its seed are simply passed from one set of saws to the other, and the last set of saws has mainly effected the ginning operation with more or less of the same action upon the fiber as in the common type of saw gin and the seed was not eliminated until the final action of the last saw cylinder of the series. Further attempts have been made to solve this difficulty, which is generally recognized by those skilled in the art as incident to the ginning operation, by employing a series of grooved rollers in connection with the saws and into the grooves of which the saws extended; but in such cases no ready escape has been provided for the ginned or denuded seed, and as a result effective and economic ginning has not been possible.

With these generally stated matters in view, the aims and purposes of the present invention are to provide a cotton gin of the saw type, wherein the saws may be enabled to act upon the seed cotton to detach the fiber therefrom without injury to the resultant products and permit the efficient discharge of the denuded seed without interfering with desirable economic conditions.

The features of the invention for securing the stated results will best be made clear from the following description and accompanying drawings of one form of means for carrying the invention into practical effect, it being understood that the details of said means may be greatly varied within the true scope of the invention in its broad aspects as pointed out by the claims.

Figure 2:
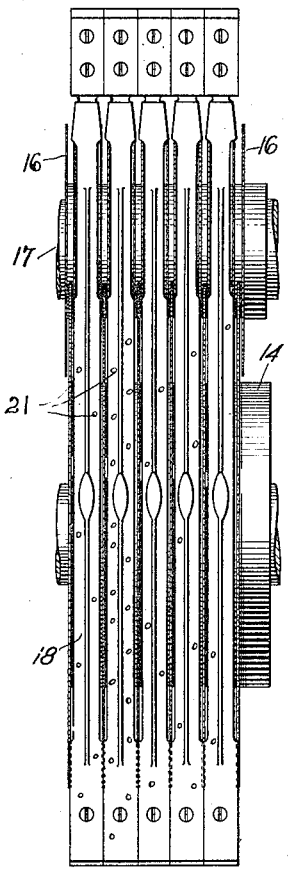
Figure 3:
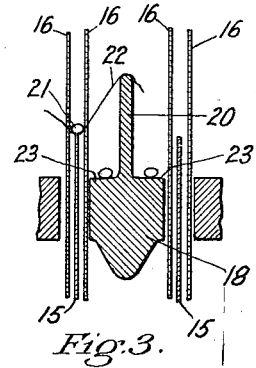

In the said drawings: Figure 1 is a central transverse sectional view of a cotton gin illustrating one form of the invention as applied thereto; Fig. 2 is an enlarged detail front view showing the saws and doffing disks in edged elevation and the seed conveyers and their relation to the saws and doffing disks; and Fig. 3 is an enlarged detail sectional view on line 3—3, Fig. 1.

The general frame work for supporting the operating parts may be of any desired or preferred form, that shown in the drawings herewith comprising side frames 1 rising from base portions 2 and provided with usual means for sustaining the operating parts of the machine. Since such devices and the manner of supporting them in their journals are old and well known, they are not herein shown in detail, in order to simplify the illustration.

Mounted above the ginning elements to be hereinafter described, is the feeder comprising an open top portion 3 in which is sustained a roller 4 provided with stirrers or brush blades and the agitating paddle wheels or like devices 5. The frame work of the feeder is suitably formed and has at its lower portion an outlet 6 for dust, dirt and other waste products incident to the action of the agitators in the feeder, and disposed between said opening 6 and the agitators in the feeder is a screen 7, which may be of any usual character, and is provided to permit the dust, dirt and other impurities to be separated from the seed cotton prior to the seed cotton being fed to the ginning elements. Such dirt and leaf brush that is thus eliminated from the seed cotton in the feeder finds its way through a chute or conveyer 8 to a suitable point away from the ginning elements, as clearly indicated in Fig. 1. The feeder is likewise provided with a spout 9 through which the cleaned seed cotton may be fed, as indicated by the arrows in Fig. 1, into the roll box of the gin.

In the present form of the invention, the roll box may be of any usual or desired character and in the form of the invention herein illustrated it comprises the usual side plates and breast, which may be pivotally connected to the frame work of the machine as at 10, while the bottom board 11 thereof may rest against a suitable sustaining rod or adjusting element 12. In these respects the roll box and the parts described need not differ from those heretofore in use, the construction being as usual and operating so that upon raising the roll box or turning it about its pivotal mounting 10, the roll of seed cotton therein may be lifted from the saws of the gin to be described to thereby suspend the ginning operation.

Mounted at the lower part of the gin breast is the huller roller 13, the blades of which are adapted to engage the seed cotton as it falls from the chute 9, as indicated by the arrows, and direct the seed cotton into coöperative relation with the ginning elements.

Extending transversely between the side frames 1 of the machine is the saw cylinder 14 which is provided with a series of saws 15, the teeth of which are intended to perform the ginning operation—that is, the detachment of the fiber from the cotton seed. The saw cylinder and its series of saws 15 may be of any usual character and be driven as usual from its driving shaft.

Disposed in coöperative relation with the saws of the saw cylinder is a doffer, which, in the present form of the invention, comprises a series of disks 16 sustained upon a shaft 17 and suitably spaced apart, the construction being such that each pair of doffing disks 16 shall overlap or interlock with one of the saws of the saw cylinder, as clearly indicated in Fig. 2. The doffer and its disks do not act upon the seed cotton as do the saws of the gin, that is, they do not actively engage and strip from the seed the fiber, but serve to engage and temporarily hold the seed while the saws act upon the seed, and then to lift and move the seed in an upward direction in the roll box, the said doffing cylinder and its disks being rotated in the same direction as the ginning saws. To more effectively cause this characteristic action of the doffer disks upon the seed after they have been treated by the saws, the peripheral edged portions of the disks may be provided with indentations or corrugations, more or less rounded, so as to engage and lift the seed and to move it in the direction of rotation of the roll of cotton and seed in the roll box, as indicated by the arrows, Fig. 1.

From the construction shown and described as one form of the present invention, it will be noted that a saw passes between or overlaps a pair of doffing disks, and that at each side of each disk there is sufficient space for the seed to move sidewise away from the ginning point, so that the seed is not retained at the ginning point except to have its fiber taken from it, when, after being denuded or partly denuded, it may escape freely sidewise from the ginning point and not be injured by the saws. These disks, as shown, are preferably formed of thin metal, and are, as a consequence somewhat laterally flexible in character, a feature that may contribute to the excellent quality of the product, because it prevents the seed being jammed against the saws and its hull more or less injured or stripped from it.

Extending between the saws 15 of the saw cylinder are a series of seed conveyers 18, the purpose of which is to direct the seed in a downward direction between the saws after such seed has been properly denuded of its fiber. To this end, also, the saws of the saw cylinder are disposed a sufficient distance apart to permit the seed to pass between the saws, and the seed conveyers are so formed as to provide a directing surface between the saws for the seed to pass them out at the lower part of the breast, as indicated in Fig. 1. The broad characteristic of the seed conveyers 18 is that they do not take part in the ginning operation, that being performed solely by the saws as they pass between the disks of the doffer, but provide between the properly separated saws of the saw cylinder a conveying device to permit the seed, after having been treated by the saws, to pass downward between the saws and from the machine. In the particular form of the seed conveyers shown in the drawing, they preferably comprise metal flanged strips, which may be secured at their lower ends to the bottom board 11 and at their upper ends to the top board 19 of the gin breast, as indicated in Fig. 1, it being understood that one of said seed conveyers extends between and separates each of the saws of the saw cylinder from its neighbor. The seed conveyers 18 are preferably extended upward between the pairs of doffing disks, as indicated in Fig. 2.

From the construction thus far described, it will be noted that the ginning of the seed cotton takes place solely between the overlapping portions of the saws and doffing disks and that the former take from the seed the fiber, while the latter move the treated seed in an upward direction corresponding to the movement of the roll in the roll box, and that the said conveyers do not act to assist in the ginning operation but simply provide a conveyer between each pair of saws to enable the seed, when properly treated and denuded of its fiber, to readily pass from the roll box downward and out of the machine, as clearly indicated in Fig. 1. This it may the more readily do, because the space at each side of the disks of each pair is unobstructed, the disks are thin and laterally flexible in character, so that they may move away from the ginning point onto the conveyer and then from the machine.

In order to preserve the full length and strength of the cotton fiber, it is desirable that the same fiber shall not be simultaneously treated or engaged by two saws, and one feature of the present invention provides means to secure this object. In the present instance, the seed conveyers 18, Fig. 3, are provided with a flanged portion 20 which extends inward or toward the roll box from the seed conveying portion of the conveyers and at the point where the ginning operation takes effect between the saws and the doffer, the construction being such that while a seed 21 is being treated by a saw and one pair of doffing disks, as diagrammatically shown in Fig. 3, the fibers 22 attached to that seed cannot be engaged by the adjoining saw, but will ride over and upon the flange 20. When the fiber has been detached from the seed, the seed will be moved upward in the direction of the roll in the roll box and finally find its way onto the ledges 23 of the seed conveyer at each side of the flange 20, and on said ledge the seed will pass downward and out of the machine, as indicated in Fig. 1. The seed conveyers 18 may also be provided with the projecting flanges 24ˣ at a point adjacent the huller roller 13 to coöperate with said rollers.

As hereinbefore noted, when it is desired to stop the ginning operation, the gin breast, including the seed conveyers may be turned around its pivotal connection 10 with the supporting frame to lift the roll of cotton in the roll box away from the saws, so that without stopping the saws, the ginning action of the machine will cease. At this time, since the saws are so widely separated that seed can readily pass between them, it is desirable that the seed conveyer may not come entirely from between the saws or from between the doffing disks, thereby closing any exit for the seed downward between the saws and doffing disks without traveling over the seed conveyers. To this end, each seed conveyer is provided with a nose or projection 24, Fig. 1, which extends backward between the saws or doffing disks some distance and which, even when the gin breast is raised in the manner stated, still extends between the saws and doffing disks.

That the roll of cotton and seed in the roll box may be held in ginning relation to the saws and doffing disks, there is pivotally mounted at 25 a part 26 which, for identification, may be termed the yielding roll presser. At its upper end this yielding roll presser is connected to one end of a spring 27, the other end of said spring being connected at 28 to a fixed part on the breast. From this construction, it will be noted that as the roll in the roll box is being treated by the saws and gin, the roll presser 26 will press upon the roll of cotton and seed and hold it in coöperative relation with the saws. Since the character of cotton and seed vary greatly, it is desirable that the pivoted supporting end 25 of the roll presser 26 may be adjusted toward and from the ginning point of the saws, and to this end the pivotal point 25 of the roll presser 26 is eccentrically mounted upon a disk 29 which, by suitable means not shown, such as a handle, may be turned to carry the pivotal point 25 nearer to or farther from the ginning point of the saws where they act upon the seed held by the doffing disks. The saws having removed the fiber from the cotton seed by rotation in the direction shown by the arrow in Fig. 1, and also thrown from their upper portion the motes and other impurities, the fiber itself is carried forward and detached from the saws by a suitable means such, for instance, as the rotating brush 30. In the present form of the invention the rotating brush 30 is surrounded by a suitable casing 31 and directs the cotton fiber into an exhaust flue or conveyer 32, as indicated by the arrows in Fig. 1. Obviously, other means for detaching the fiber from the saws may be employed, and various modifications and changes may be made in the character and form of the various parts without departing from the true spirit of the invention.

From the construction hereinbefore described, it will be noted that the saws are separated a sufficient distance apart to permit the denuded seed to pass between them, and that the said conveyers extend between the saws and direct the denuded seed from the machine while passing between the saws. It will also be noted that the entire ginning operation is performed by the saws at the point where they act upon the seed as it comes against the edge of a pair of doffing disks and is there momentarily held while the saw pulls and gently separates the fiber from the seed while the doffing disks tend to move the seed upwardly in the direction of the rotating movement of the cotton and seed in the roll box. Owing to the thin character of the doffer disks and the unobstructed space at the right and left of the ginning point, the seed is retained at the ginning point only temporarily, as will be obvious, and is free to move away from said point as soon as its fiber has been taken from it and to pass to the surface of the conveyer beyond or back of the ginning point. It will be further noted that the seed conveyers, where they extend between the pairs of doffing disks, simply form an abutment to prevent seed passing between the disks, and while the doffing disks may have their edges notched, or serrated, or indented, such doffing disks do not detach fiber from the seed and carry it out of the roll box as do the saws, but merely act upon the seed to hold them and move them in the manner hereinbefore described while the saws thus perform the entire separation of lint from the seed and carry it outside of the roll box.

I make no claim herein broadly to the combination with a saw cylinder or saw cylinders of a doffer consisting of disks having toothed or roughened peripheries.

What is claimed is:

1. In a cotton gin, the combination of a saw cylinder and its saws, a pair of doffing disks arranged close together one on each side of and overlapping each saw, the doffing disks between adjacent saws being disposed at a greater distance apart than the disks of each pair, and a seed conveyer extending between each of the saws and separating and extending between the pairs of doffing disks.

2. In a cotton gin, the combination of a saw cylinder and its saws, doffing disks having roughened peripheral edges and overlapping the saws, a huller roller, and a seed conveyer extending between the saws and separating the doffing disks in pairs, said seed conveyer having a portion projecting from between the saws above the huller roller.

3. In a cotton gin, the combination of a series of saws separated a distance to permit cotton seed to pass between them, a doffer comprising a pair of thin metallic disks for each saw having portions overlapping the saws at each side thereof, the peripheries of said portions being roughened to lift and move seed from the ginning point, seed conveyers extending between the saws, and means for removing fiber from the saws.

4. In a cotton gin, the combination of a saw cylinder and its saws, a doffer comprising rotating portions overlapping said saws and provided with peripheral indentations, and a seed conveyer extending between saws to convey the denuded seed from the machine and having a projecting portion extending beyond the peripheries of the saws below the cotton roll in the roll box.

5. In a cotton gin, the combination of a series of saws, a series of doffing disks overlapping the saws to lift and move the seed in the direction of the seed cotton roll movement in the roll box that the cotton fiber may be pulled from the seed by the saws uninjured, and a seed conveyer extending downwardly between the saws and having seed conveying portions to direct seed from between the saws, said seed conveyer having a projection extending beyond the peripheries of the saws below the cotton roll in the roll box.

6. In a cotton gin, the combination of a series of saws separated a distance to permit cotton seed to pass between them, a doffer having portions extending between the saws, the peripheries of said portions being roughened to lift and move seed from the ginning point, seed conveyers extending between the saws, and between and within the peripheral portions of the doffer, and means for removing fiber from the saws, said means and doffer being separated a distance to permit moting between them.

7. In a cotton gin, the combination of a series of saws separated a distance to permit the passage of seed between them, a doffer having portions extending between the saws and provided with roughened peripheries, and seed conveyers extending between the saws and between and within peripheral portions of the doffer.

8. In a cotton gin, the combination of a series of saws separated a distance to permit cotton seed to pass between them, a doffer having portions extending between the saws, the peripheries of said portions being roughened to lift and move seed from the ginning point, seed conveyers extending between the saws, means below the doffer and acting to remove fiber from the saws, and a protector to prevent motes thrown from the saws between the doffer and said means from mixing with the fiber.

9. In a cotton gin, the combination of a series of saws separated a distance to permit cotton seed to pass between them, a doffer having portions extending between the saws, the peripheries of said portions being roughened to lift and move seed from the ginning point, seed conveyers extending between the saws, a brush for removing fiber from the saws, a hood or casing for protecting the brush from motes thrown from the saws between the doffer and brush.

10. In a cotton gin in which the fiber is taken from the seed by the action of a revolving saw, the combination of ginning saws separated from each other a distance greater than the length of two seeds, and a pair of doffing disks coacting with each saw, the disks of each pair being disposed on opposite sides of and overlapping the saw, the distance between the pairs of disks being greater than the distance between the disks of the pairs.

11. In a cotton gin of the character described, the combination of a series of ginning saws, a pair of thin metallic doffing disks coacting with each saw, the disks of each pair being disposed on opposite sides of and overlapping the saw, and said pairs of doffing disks being separated a distance laterally forming an unobstructed space between the pairs of disks to permit cotton seen to move away from the ginning point.

12. In a cotton gin of the character described, the combination of a series of ginning saws, a pair of doffing disks coacting with each saw, the disks of each pair being disposed at opposite sides of the saw and overlapping the same, the saws and pairs of disks being separated laterally a distance greater than the distance between the disks of a pair, and a conveyer extending between adjacent saws and between the pairs of disks and disposed back of or beyond the ginning point to permit seed to move away from the ginning point.

13. In a cotton gin for removing cotton from the seed by the action of saws, a series of ginning saws separated laterally to permit seed to pass between them, a pair of thin metallic doffing disks coacting with each saw, the disks of the pair being arranged at opposite sides of and overlapping the saw, and the pairs of doffing disks being separated a distance to permit seed to pass between them, and a seed conveyer extending between adjacent saws and adjacent pairs of doffing disks and disposed back of the point where a saw and its coacting doffing disks begin their overlapping relation.

14. In a cotton gin for removing cotton from the seed by the action of saws, a series of ginning saws separated laterally to permit seed to pass between them, a pair of flexible disks overlapping each saw, and a seed conveyer extending between the saws and between the pairs of flexible disks.

15. In a cotton gin of the character described, the combination of a series of ginning saws, a pair of thin laterally flexible metallic doffing disks coacting with each saw, the disks of each pair being disposed on opposite sides of and overlapping the saw, and said pairs of doffing disks being separated a distance laterally forming an unobstructed space between the pairs of disks to permit cotton seed to move away from the ginning point.

In testimony whereof, I have signed my name to this specification, in the presence of two subscribing witnesses.

JOHN R. FORDYCE.

Witnesses:
R. E. BISHOP,
JOE SCHMELZER.